W. H. BOWMAN.
Adjustable Ferrules for Agricultural Implements.
No. 152,454. Patented June 30, 1874.
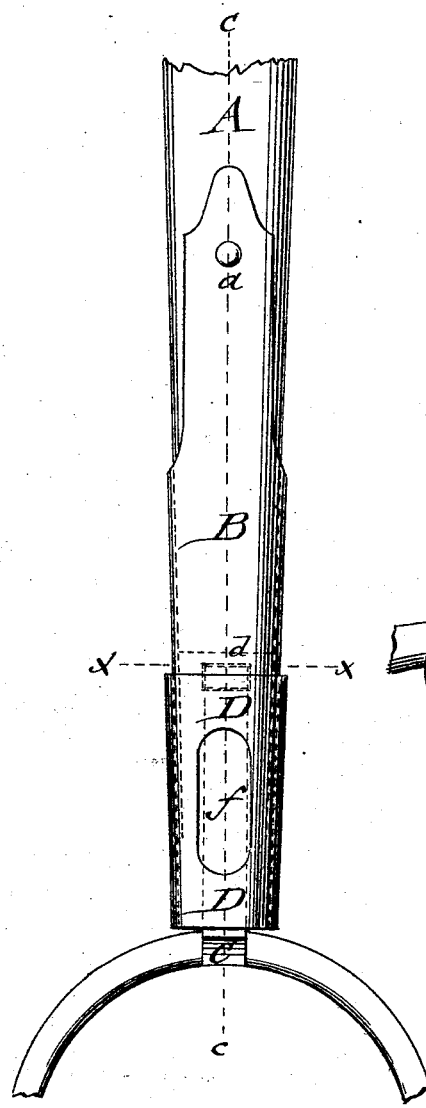
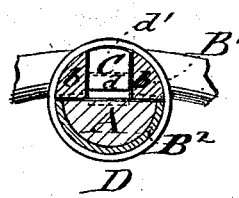
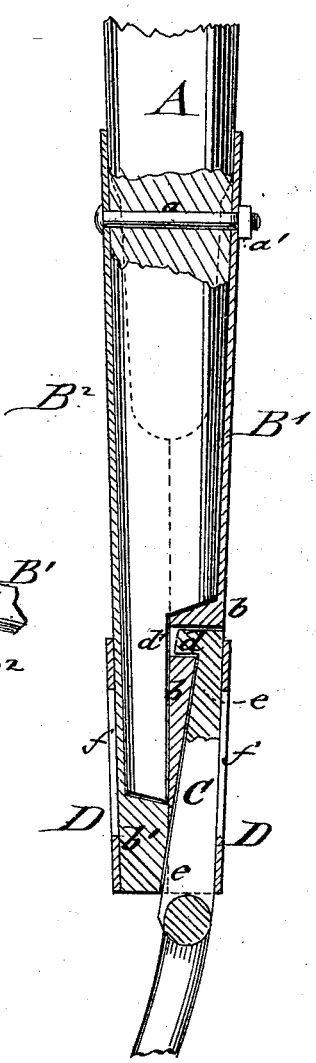
WITNESSES:
INVENTOR:
W. H. Bowman
BY
ATTORNEYS.

UNITED STATES PATENT OFFICE.

WILLIAM H. BOWMAN, OF LONDON, OHIO.

IMPROVEMENT IN ADJUSTABLE FERRULES FOR AGRICULTURAL IMPLEMENTS.

Specification forming part of Letters Patent No. 152,454, dated June 30, 1874; application filed December 13, 1873.

*To all whom it may concern:*

Be it known that I, WILLIAM H. BOWMAN, of London, in the county of Madison and State of Ohio, have invented a new and Improved Adjustable Ferrule for Agricultural Implements, of which the following is a specification:

In the accompanying drawing, Figure 1 represents a front elevation of my improved ferrule for attaching forks, hoes, and other agricultural implements to their handles; Fig. 2, a vertical central section on the line $c\ c$, Fig. 1; and Fig. 3, a horizontal section of the same on the line $x\ x$, Fig. 1.

Similar letters of reference indicate corresponding parts.

The invention will first be fully described, and then pointed out in the claim.

In the drawing, A represents the handle of an agricultural implement, the end of which is of conical shape, being recessed at the lowermost part thereof to half its thickness, as indicated in section in Fig. 2. The ferrule B is made of two halves, $B^1\ B^2$, which fit symmetrically over the handle end, being connected to the same at their uppermost extremities by a screw-bolt, $a$, and nut $a'$. One half, $B^1$, of ferrule B is cast, or otherwise provided, with a solid lower part, $b$, which extends into the recessed end of handle A, and to some distance below the same. The other half-section $B^2$ extends to the same length below the handle A, and supports, by its solid end, part $b'$, the lowermost end of the handle. The fork, hoe, shovel, rake, or other implement, is provided with a tongue, C, of wedge shape, which has, at its upper end, a lug, $d$, projecting under right angles to the body of the tongue. The outer part of ferrule, section $B^1$, as well as the inside of solid part $b'$ of section $B^2$, is arranged with an inclined groove, $e$, which corresponds in size and shape exactly to tongue C, while a recess or perforation, $d'$, of section $B^1$, at the upper end of groove $e'$, admits lug $d$. A conical band or sleeve, D, is placed over the lower ends of the ferrule after the tongue C has been inserted into position, binding the parts firmly together.

Sleeve D may be arranged with oblong slots $f$ at the sides, by which not only the connection of the parts may be more easily performed, but also the weight of the same decreased.

When the handle shrinks the ferrule is tightened by driving up the band. The band takes hold of the outer side of the tongue simultaneously with the ferrule halves, as it forms, on account of the inclined groove and its inner wedge shape, part of the circumference of the ferrule. The lug locks the tongue securely to the ferrule, dispensing thereby with a hole in the tongue, which, generally, weakens the same too much, making it liable to break. In case the handle or the attachment breaks either part may be readily taken off and be replaced, the ferrule remaining still serviceable. The firm setting of the tongue in the socket prevents its getting out, loosening, or twisting, while the outer band locks ferrule, handle, and tongue rigidly and compactly together.

Having thus described my invention, I claim as new and desire to secure by Letters Patent—

The combination of a ferrule made of two parts, $B^1\ B^2$, having, respectively, the inward projections $b\ b'$ and grooves $e\ d'$, with the conical sleeve D, as and for the purpose described.

WILLIAM H. BOWMAN.

Witnesses:
A. CHRISMAN,
LEONARD EASTMAN.